United States Patent [19]

Cook et al.

[11] Patent Number: 5,468,382
[45] Date of Patent: * Nov. 21, 1995

[54] DEPTH FILTER MEDIA

[75] Inventors: Nigel J. D. Cook; Kenneth R. Weight, both of Hampshire; Richard G. Gutman, West Sussex; Roger A. Buttery; Michael Grimes, both of Hampshire, all of England

[73] Assignee: Pall Corporation, East Hills, N.Y.

[*] Notice: The portion of the term of this patent subsequent to Jan. 18, 2011, has been disclaimed.

[21] Appl. No.: 176,274

[22] Filed: Dec. 30, 1993

Related U.S. Application Data

[63] Continuation of Ser. No. 756,598, Sep. 9, 1991, Pat. No. 5,279,731.

[51] Int. Cl.$^6$ ................................. B01D 27/06
[52] U.S. Cl. ................... 210/232; 210/484; 210/489; 210/493.5; 210/494.1; 210/496; 210/497.2; 55/500; 55/521; 55/527; 55/DIG. 5
[58] Field of Search ...................... 210/232, 484, 210/489, 493.5, 494.1, 496, 497.2, 493.1; 55/500, 521, 527, DIG. 5

[56] References Cited

U.S. PATENT DOCUMENTS

| | | | |
|---|---|---|---|
| 4,032,688 | 6/1977 | Pall | 428/36 |
| 4,089,783 | 5/1978 | Holyoak | 210/358 |
| 4,104,170 | 8/1978 | Nedza | 210/487 |
| 4,233,042 | 11/1980 | Tao | 55/482 |
| 4,539,107 | 9/1985 | Ayers | 210/493.1 |
| 4,594,162 | 6/1986 | Berger | 210/493.1 |
| 4,693,985 | 9/1987 | Degen et al. | 210/493.1 |
| 4,878,929 | 11/1989 | Tofsland et al. | 210/493.5 |
| 4,921,600 | 5/1990 | Meissner | 210/493.1 |
| 5,084,178 | 1/1992 | Miller et al. | 210/493.1 |

FOREIGN PATENT DOCUMENTS

| | | |
|---|---|---|
| 0001407 | 4/1979 | European Pat. Off. . |
| 0083789 | 7/1983 | European Pat. Off. . |
| 0347188 | 12/1989 | European Pat. Off. . |
| 60-147206 | 8/1985 | Japan . |
| 62-155912 | 10/1987 | Japan . |
| 585295 | 2/1947 | United Kingdom . |
| 1047456 | 11/1966 | United Kingdom . |
| 1389199 | 4/1975 | United Kingdom . |
| 1401231 | 7/1975 | United Kingdom . |
| 1538957 | 8/1976 | United Kingdom . |
| 1460925 | 1/1977 | United Kingdom . |
| 2101902 | 1/1983 | United Kingdom . |
| 2152399 | 3/1984 | United Kingdom . |
| 2152471 | 12/1984 | United Kingdom . |
| 1484669 | 11/1993 | United Kingdom . |

Primary Examiner—Robert A. Dawson
Assistant Examiner—W. L. Walker
Attorney, Agent, or Firm—Leydig, Voit & Mayer

[57] ABSTRACT

A porous filter medium is formed by a pleated cylinder of a depth filter medium. An absolute rated inner filtration layer is arranged between upstream and downstream drainage layers. The depth filter medium is formed from a continuous sleeve. Additionally or alternatively at least the downstream drainage layer may be formed integrally with at least a part of an inner filtration layer. The material of the medium may be a fibrous mass of non-woven synthetic polymeric microfibres which are free of fibre-to-fibre bonding and are secured to each other by mechanical entanglement or intertwining, with the diameter of the fibrous structure varying across the medium.

49 Claims, 4 Drawing Sheets

DEPTH FILTER MEDIA

This application is a continuation of application Ser. No. 07/756,598 filed on Sep. 9, 1991 which is now U.S. Pat. No. 5,279,731.

BACKGROUND TO THE INVENTION

1. Field of the Invention

The invention relates to depth filter media.

In this specification "depth filter" means a filter with pores capable of removing from a fluid particles that may be smaller than the size of pores in the filter, the particles being trapped by progressive interception during changes of direction of the pores. Such depth filters have a high dirt capacity.

Depth filters are commonly utilized in the form of a thick continuous cylinder of filter medium that surrounds a central core and may be provided with an external cage. Such depth filters have, because of their low external area and great depth (typically about 15 mm) a relatively high pressure drop when a fluid is passed through the filter. On the other hand, as mentioned above, such filters have relatively high dirt capacity, because of the high internal void space in which contaminant can accumulate.

2. Brief Review of the Prior Art

GB-A-585295 discloses a filter element formed by an elongated web of cellulose filter material folded to extend back and forth between the inner and outer surfaces of the tubular body. The folds extend longitudinally and a tubular binding strip is secured to the inner folds. No drainage layer is provided. GB-A-1389199 discloses a filter formed by corrugating a flat sheet felt medium backed by woven wire. The ends of the sheet are sealed after pleating. The woven wire supports the felt and no drainage layer is provided.

GB-A-1460925 discloses a filter element formed from a corrugated sheet of depth filter medium in which the edges of the sheet are connected together after corrugation. Separate upstream and downstream protective layers are provided. U.S. Pat. No. 4,233,042 discloses a pleated filter medium formed from sheets of glass fibre. EP-A-0083789 discloses a pleated sheet of filter material such as a fibrous filter material. The edges of the sheet are side-sealed after corrugation.

Although pleating increases the surface area per unit volume of filter material, and thus increases the dirt capacity, the presence of side seals formed after pleating can be disadvantageous. First, the presence of the seal forms an obstruction to uniform flow through the filter element. Secondly, the formation of the side seal requires additional manufacturing steps after pleating (see GB-A-1460925). Thirdly, the presence of a side seal forms a potential leakage path because complete sealing is difficult.

In order to achieve optimum performance of a pleated filter, it is necessary to provide a relatively coarse upstream drainage layer to allow drainage of fluid down between the pleats and to give a void space for the accumulation of dirt. They also support the filter medium. It is also necessary to provide a relatively coarse downstream drainage layer to allow filtrate to drain between the pleats from an inner filtration layer and also to support the filter medium against applied pressure.

The drainage layers are conventionally formed separately from the filter medium by layers of non-woven fabrics or nets located on either side of the filter medium (see GB-A-1460925). The provision of such separate layers and their attachment to the filter medium complicates the manufacture of the filter and increases its cost.

SUMMARY OF THE INVENTION

According to a first aspect of the invention, there is provided a filter element comprising a generally cylindrical depth filter medium formed by at least one continuous sleeve of filter medium without any side seal, the filter medium being provided with pleats extending along the length of the filter medium and parallel to one another around the filter medium, and an inner support core within the pleated depth filter medium and contacting inward ends of the pleats.

According to a second aspect of the invention, there is provided a filter element comprising a generally cylindrical depth filter medium including an inner filtration layer arranged between upstream and downstream drainage layers, the downstream drainage layer being formed integrally with at least a part of the inner filtration layer and having an absolute rating that is greater than the absolute rating of the inner filtration layer, the depth filter medium being provided with pleats extending along the length of the filter medium and parallel to one another around the filter medium, and an inner support core with the cylindrical depth filter medium contacting inner pleats.

According to a third aspect of the invention, there is provided a method of manufacturing a filter element comprising forming at least one continuous sleeve of depth filter medium without any side seal, pleating the sleeve to form a plurality of pleats extending along the length of the filter medium and parallel to one another around the filter medium, and arranging an inner support core within the pleated depth filter medium contacting inward ends of the pleats.

According to a fourth aspect of the invention, there is provided a method of manufacturing a filter element comprising forming a generally cylindrical depth filter medium including an inner filtration layer, arranged between upstream and downstream drainage layers, forming the downstream drainage layer integrally with at least a part of the inner filtration layer and with an absolute rating that is greater than the absolute rating of the filtration layer, pleating the depth filter medium to provide pleats extending along the length of the filter medium and parallel to one another around the depth filter medium and then providing an inner support core within the pleated depth filter medium and contacting inner pleats.

By forming the drainage layers integrally with at least a part of the inner filtration layer the dirt capacity and pressure drop can be improved. The ease and cost of manufacture are also improved.

The following is a more detailed description of an embodiment of the invention, by way of example, reference being made to the accompanying drawings in which:

DESCRIPTION OF THE PREFERRED EMBODIMENTS

Referring first to FIGS. 1 to 4, the filter element comprises a generally cylindrical depth filter medium 10 provided with pleats 11. Each pleat extends along the length of the filter medium and the pleats together extend parallel to one another around the filter. An inner support core 12 is arranged within the cylindrical depth filter medium and contacts inner pleats. An outer support cage 13 contacts the outer pleats.

Figures 1, 2:
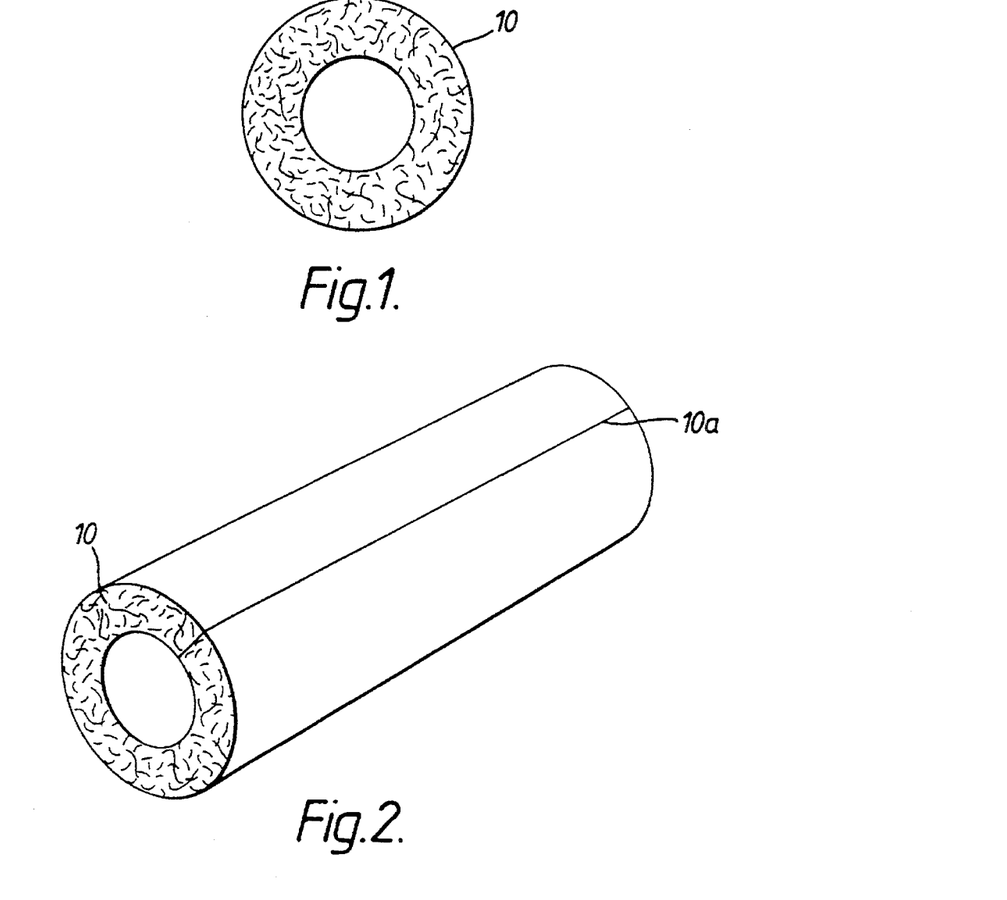
FIG. 1 is a cross-section of a cylinder of depth filter medium prior to pleating and formed as a continuous cylinder.
FIG. 2 is a perspective view of a cylinder of depth filter medium prior to pleating and formed from a rectangular sheet of medium with opposite edges sealed together by a side seal.
Figure 3:
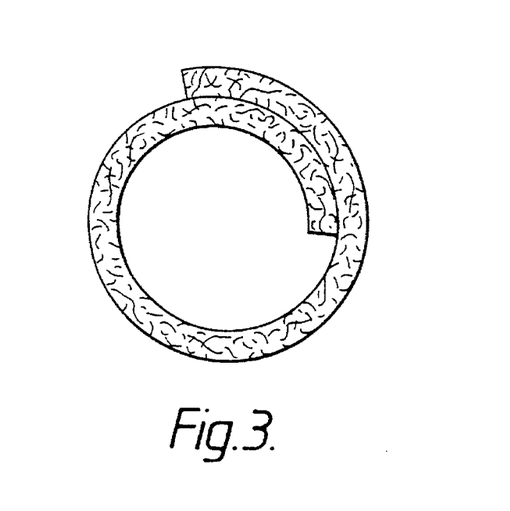
FIG. 3 is a cross-sectional view of a cylinder of depth filter medium prior to pleating and formed from a rectangular sheet of medium rolled so that opposed edges of the sheet overlap at least once

The cylinder of depth filter medium 10 may be a continuous sleeve of filter medium without any side seal. This is shown in FIG. 1. A second possibility is to form the cylinder of filter medium 10 from a flat sheet of depth filter medium that has been sealed with a seal 10a to form a cylinder. This is shown in FIG. 2. A third possibility is to roll a flat rectangular sheet into a cylindrical roll with opposed edges of the sheet overlapping at least once. This is shown in FIG. 3.

The filter medium may be a fibrous structure such as polyolefins, polyesters, polyamides, glass fibres, cellulose fibres or metal fibres. For example, the depth filter element may be formed from fibres produced by a melt blowing process and having diameters from 1–20 micrometers, preferably 1–12 micrometers. Such a melt blowing process is the subject of U.K. Patent Application Publication No. 2152471A.

The voidage of the depth filter medium may be constant throughout its depth.

The overall length of the depth filter medium 10 may be from 1–250 cms and preferably from 2–100 cms. The outside diameter of the depth filter medium 10 may be between 2–100 cms and is preferably between 4–40 cms. In the embodiment illustrated in FIG. 4, there are 16 pleats, but there may be between 6–300 pleats, preferably between 8–32 pleats. The pitch of the pleats may be between 2–50 mm but is preferably between 4–15 mm. The depth of the pleats may be from 4–50 mm and preferably 5–25 mm.

The depth filter medium may have a thickness of between 0.5–25 mm and preferably between 1–25 mm. The ratio of the surface area per unit length to the depth may be from 20 to 2000 and is preferably from 40 to 200.

The fibres may be randomly directed or may be directed with an element of circumferential or axial orientation.

Figure 4:
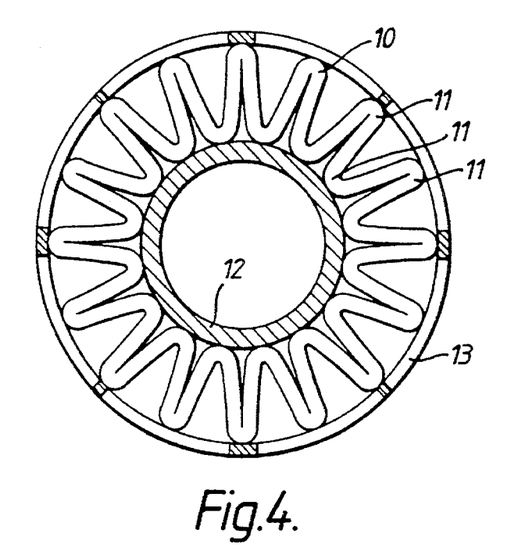
FIG. 4 is a cross-section through a filter element including a depth filter medium.
Figure 5:
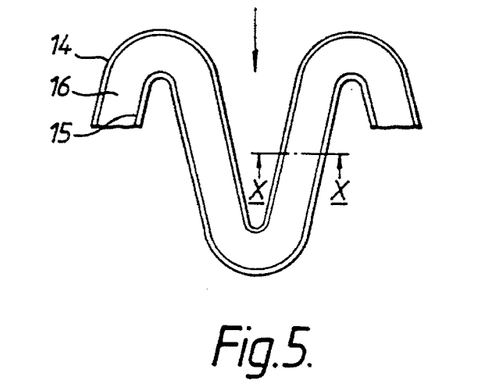
FIG. 5 is a schematic cross-section of part of a first pleated cylinder of depth filter medium of the kind shown in FIG. 4 and provided with integral upstream and downstream drainage layers.

Referring next to FIG. 5, a first form of pleated cylinder of the kind described above with reference to FIG. 4 comprises a filter medium made by the method disclosed in GB-A-2152471 so that it is formed from a fibrous mass of non-woven, synthetic, polymeric micro-fibres, the micro-fibres being substantially free of fibre to fibre bonding and secured to each other by mechanical entanglement or intertwining. The fibrous mass has a substantially constant voids volume over at least a substantial portion thereof as measured in the radial direction.

As not disclosed in that specification, however, the fibrous mass of the filter of FIG. 4 is formed with outer and inner portions 14,15 of fibres which have a greater diameter than the fibres of the inner filtration portion 16. Thus, the outer and inner portions are comparatively coarse and provide upstream and downstream drainage layers 14,15 respectively while the central portion provides the absolutely rated inner filtration layer 16 of the filter medium.

The diameters of the fibres may be varied in a number of different ways. Firstly, the diameter of the fibres may be decreased gradually from the outer surface of the upstream drainage layer 14 to the centre of the inner filtration portion 16 and then may be increased from the centre of the inner filtration portion 16 to the surface of the downstream drainage layer 15. Secondly, the diameter of the fibres may be generally uniform in the upstream and downstream drainage layers 14,15 and the diameter of the fibres may be generally uniform in the inner filtration portion 16, this diameter being less than the diameter of the fibres in the upstream and downstream drainage layers 14,15. Of course, the diameter of the fibres may also be varied in a combination of the ways described above. As a third example, the diameter of the fibres may decrease from the outer surface of the upstream drainage layer 14 and may then have a generally constant smaller diameter in the inner filtration portion 16 before increasing to the surface of the downstream drainage layer 15.

Figure 6:
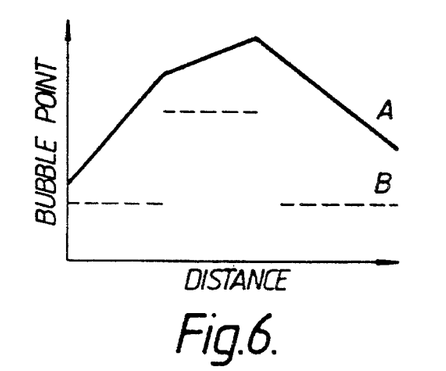
FIG. 6 is a graph plotting Bubble Point pressure against distance as measured from the upstream drainage layer in a direction normal to the surface of the upstream drainage layer, for first and second forms of filter of the kind shown in FIG. 5.

One measure of pore size is the Bubble Point test. In such a test, successive sections of the filter medium across its thickness are submerged in a liquid bath to wet out all the pores. Pressure is then applied to the interior of the structure and the pressure required for the first or initial bubble of air to appear on the exterior surface of the cylinder is recorded. FIG. 6 is a graph plotting the Bubble Point pressure (i.e. the pressure required for the first or initial bubble of air) against the distance as measured from the outer drainage layer 10 in a direction normal to the surface of the layer 10 across the section X—X of the filter medium of FIG. 5 for the first and second constructions of this embodiment referred to above. The continuous line shows the Bubble Point pressure pressure variation for the uniformly decreasing and increasing fibre diameter and the broken lines show the Bubble Point pressure variation for the portions of constant fibre diameter. In both cases the voidage is constant as described above. As shown in continuous line, the Bubble Point pressure may increase from the upstream drainage layer 14 to a maximum towards the core 16 of the filter medium within the absolutely rated layer and then decrease to the downstream drainage layer 15. The lower Bubble Point pressures in the upstream and downstream drainage layers 14,15 indicate that the pore size in these regions is greater than the pore size in the absolute rated central layer 16.

In the alternative embodiment illustrated in broken line, the pore size is discontinuous between the layers, being greater in the upstream and downstream drainage layers 14,15 than in the absolute rated central layer 16.

Figure 7:
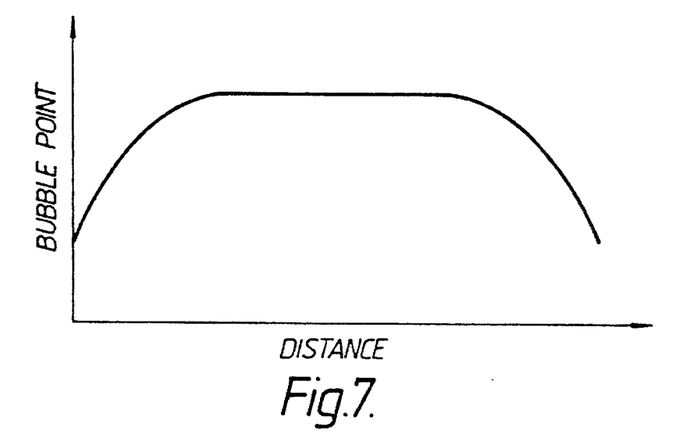
FIG. 7 is a graph plotting Bubble Point pressure against distance as measured from the upstream drainage layer in a direction normal to the surface of the upstream drainage layer, for a third form of filter of the kind shown in FIG. 5.

FIG. 7 shows the Bubble Point pressure distribution for the third construction described above. The Bubble Point pressure increases from the outer surface of the upstream drainage layer 14 to a generally constant value in the inner filtration portion 16 before decreasing to the surface of the downstream drainage layer 15.

Figure 8:
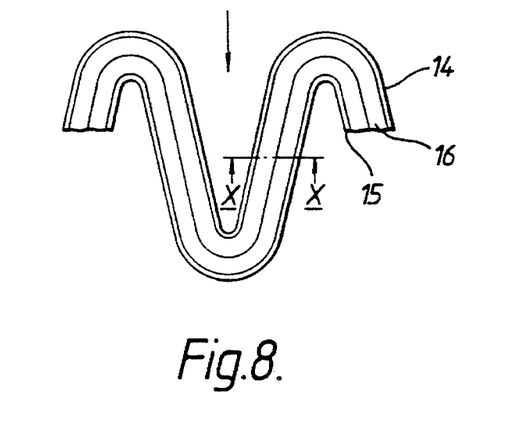
FIG. 8 is a schematic cross-section of part of a second pleated cylinder of depth filter medium of the kind shown in FIG. 4 and provided with integral upstream and downstream drainage layers.

Referring next to FIG. 8, the second form of pleated filter medium is formed by two contiguous sleeves of filter medium. The outer sleeve forms the upstream drainage layer 14 and a first portion of the absolutely rated inner filtration layer 16 while the inner sleeve forms the other portion of the absolutely rated inner filtration layer 16 and the downstream drainage layer 15. Each sleeve may be formed as described in examples 11,12,13,47 and 48 of GB-A-2152471. One sleeve is then turned inside out so that the coarser outer layer becomes the downstream drainage layer 15 and so forms the inner sleeve. This inner sleeve is then inserted into the outer sleeve to give the structure shown in FIG. 7. Of course, the whole of the inner filtration layer 16 may be provided by only one of the sleeves (either the inner or the outer). Of course, the requisite structure for the inner sleeve could be formed by the method described and so obviate the need to turn inside a sleeve of reverse structure.

The diameters of the fibres making up the sleeves may be varied as described above with reference to FIGS. 5 and 6. The upstream and downstream drainage layers 14,15 may be of constant fibre diameter throughout their depth to give a uniform pore size with the composite absolutely rated core layer also being of constant, finer, pore size across its depth being formed from fibres of a uniform diameter which is smaller than the diameter of the fibres of the upstream and downstream drainage layers.

Secondly, the pore size may vary continuously from a coarser to a finer value from the upstream drainage layer 14 to the centre of the absolutely rated inner filtration layer 16 and then from a finer to a coarser value from the centre of the absolutely rated core layer to the downstream drainage layer 15. As described above, this is achieved by decreasing the diameter of the fibres from the upstream drainage layer 14 to the centre of the inner filtration layer 16 and then increasing the diameter of the fibres to the surface of the downstream drainage layer 15.

Figure 9:
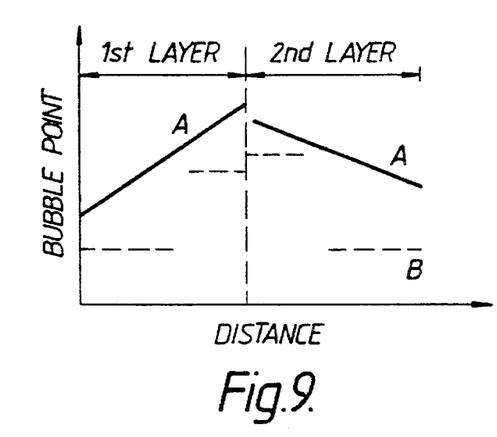
FIG. 9 is a graph plotting Bubble Point pressure against distance as measured from the upstream drainage layer in a direction normal to the surface of the upstream drainage layer, for first and second forms of filter of the kind shown in FIG. 8.

FIG. 9 is a graph plotting the Bubble Point pressure against the distance across the filter medium of FIG. 8 as measured from the upstream drainage layer 14 in a direction normal to the surface of the upstream drainage layer 14 and for these two constructions. The continuous line shows a filter medium in which the pore size varies continuously from a maximum at the surface of the upstream drainage layer 14 to a minimum at the centre of the absolutely rated inner filtration layer 16 and then to a maximum at the surface of the downstream drainage layer 11. The broken line shows coarser pore sizes in the upstream and downstream drainage layers 14,15 and a constant finer pore size in the absolutely rated inner filtration layer 16.

Thirdly, the fibre diameter may be varied so that the pore size varies with the diameter of the fibres decreasing from the surface of the upstream drainage layer 14 to a constant smaller diameter in the first portion of the inner filtration layer 16. The second portion of the inner filtration layer 16 then has a constant smaller diameter (which is greater than the first constant smaller diameter) and then increases in diameter to the surface of the downstream drainage layer 15.

Figure 10:
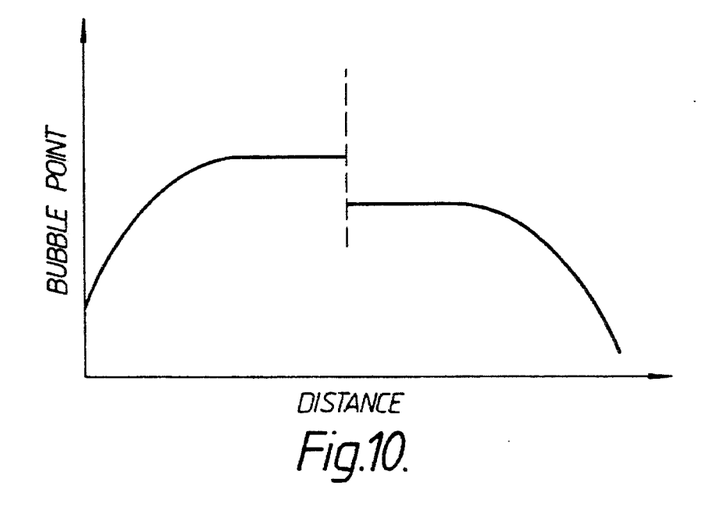
FIG. 10 is a graph plotting Bubble Point pressure against distance as measured from the upstream drainage layer in a direction normal to the surface of the upstream drainage layer for a third form of filter of the kind shown in FIG. 8.

FIG. 10 is a graph plotting the Bubble Point pressure against the distance across this third form of the filter medium of FIG. 8 as measured from the upstream drainage layer 14 in a direction normal to the surface of the upstream drainage layer.

It will be appreciated that the downstream drainage layer need not be formed integrally with the absolutely rated inner filtration layer, it could be formed by a separate layer of depth filter medium, or membrane or drainage net. It will also be appreciated that, where the inner filtration layer 16 has an absolute rating of, for example, 20 mm, a downstream drainage layer 15 having an absolute rating of 90 mm will provide an 'open' structure in comparison with the inner filtration layer 16.

EXAMPLE I

Seven filter media were prepared as described above with reference to FIG. 8 and having the structure described below in Table 1. In each case, the structure was formed from two sleeves. One of the sleeves had a decreasing pore size from the upstream surface to the downstream surface, the pore size being open (O) at the upstream surface and having an absolute rating (T) in a zone adjacent the downstream surface. (Referred to as O - T, indicating that the pore structure is open upstream and tight downstream). The other sleeve had an increasing pore size from the upstream surface to the downstream surface. Thus, this sleeve had the absolute rated pore size (T) in a zone adjacent the upstream surface and was open (O) at the downstream surface. (Referred to as T - O indicating that the pore structure is tight upstream and open downstream). The "absolute rating" of a filter medium is determined as described below.

The inner filtration layer will be formed by the zone or zones of the sleeve or sleeves which have the lowest absolute rating.

Seven filter media were prepared having the following structure:

TABLE 1

| Filter No | Upstream Structure | Absolute Rating of Upstream Structure (mm) | Downstream Structure | Absolute Rating of Downstream Structure (mm) |
| --- | --- | --- | --- | --- |
| 1 | O–T | 5  | T–O | 90 |
| 2 | O–T | 20 | T–O | 20 |
| 3 | O–T | 20 | T–O | 90 |
| 4 | O–T | 40 | T–O | 40 |
| 5 | O–T | 90 | T–O | 40 |
| 6 | O–T | 70 | T–O | 70 |
| 7 | O–T | 90 | T–O | 90 |

Each filter was nominally 254 mm long with 16 pleats and an outside diameter of 70 mm. The thickness of the medium was from 3–4 mm and the outside diameter of the inner core 35 mm.

The seven filter media were then tested for pressure drop by passing one hundred litres per minute of clean water through each filter medium and measuring the pressure drop in millibars. Next, the dirt capacity of each filter medium was measured by using a modified form of the OSU F2 test developed at Oklahoma State University. In this test, a standardised siliceous contaminant, AC fine test dust, is prepared as a stable suspension of known weight in water. This suspension is then pumped at 10 litres per minute through filter medium. The test system is equipped with two particle counters each with a range of 3 to 100 microns. One counter, upstream of the filter, records the influent particle levels and the other downstream similarly record the effluent particle levels. The samples are analysed by the counters for their content of particles greater than five or more different preselected particle diameters and the ratio of the upstream count to the downstream count is automatically recorded. Simultaneously, the pressure drop across the test filter is measured as the test suspension flowed through the filter and is recorded as a function of time. The quantity of contaminant (in grammes) incident on the filter required to develop a differential pressure of 40 psi (2.8 kg/cm$^2$) is recorded as the dirt capacity of the filter medium.

The pressure drop was then compared with the pressure drop of a known non-pleated depth filter ("non-pleated") having generally the same length and the same outside diameter as the filter medium under test and generally the same absolute rating. The known non-pleated depth filter used for comparison was thicker than the filter media of Nos. 1 to 7. The results of these tests are shown in Table 2.

The "absolute rating" is determined from the ratio measured by the counters, which is known as the beta ratio and provides the removal efficiency at each of the preselected particle diameters.

The beta ratio for each of the five or more diameters tested is plotted as the ordinate against particle diameter as the abscissa, usually on a graph in which the ordinate is a logarithmic scale and the abscissa is a linear scale. A smooth curve is then drawn between the points. The beta ratio for any diameter within the range tested can then be read from this curve. Efficiency at a particular particle diameter is calculated from the beta ratio by the formula:

Efficiency, percent=100 (1 - 1/beta).

As an example, if beta=1000 efficiency=99.9 percent.

The absolute removal ratings cited in the examples presented below are the particle diameters at which beta equals 5,000 and the efficiency is 99.98 percent.

It will be seen that the seven filter media of the kind described above with reference to FIG. 8 have significantly improved pressure drops in comparison with similarly rated non-pleated filters of similar length and diameter (e.g. the "non-pleated" filter with a pressure drop of 1500 mbar has a rating equivalent to the rating of Filter No.1). This is due, at least in part, to the higher surface area per unit volume, the reduced thickness, the absence of side seals and the presence of a drainage layer integral with a part of the inner filtration layer. In addition, the dirt capacities of the seven filter media described above with reference to FIG. 8 are high.

TABLE 2

| | Ivention of FIG. 8 | | | "Non-Pleated" Pressure drop |
| --- | --- | --- | --- | --- |
| Filter No | Absolute Rating mm | Pressure Drop at 100 LPM clean water flow rate mbar | Dirt Capacity grammes | at 100 LPM clean water flow rate at equivalent rating mbar |
| 1 | 4.3 | 285 | 17.5 | 1500 |
| 2 | 10.8 | 107 | 36 | 660 |
| 3 | 14.8 | 67 | 28 | 280 |
| 4 | 26 | 73 | 66 | 180 |
| 5 | 40 | 41 | 67 | 180 |
| 6 | 70 | 31 | 79 | 145 |
| 7 | 90 | 35 | 111 | 90 |

EXAMPLE 2

Three filter media were prepared having the structure given below in Table 3, using the same notation described above with reference to Table 1.

TABLE 3

| Filter No | Pleated (Y)/ Unpleated (N) | US | US AR | DS | DS AR |
| --- | --- | --- | --- | --- | --- |
| 8  | N | —   | 5 | — | — |
| 9  | Y | O–T | 5 | — | — |
| 10 | Y | O–T | 5 | T–O | 90 |

US = Upstream Structure
DS = Downstream Structure
AR = Absolute Rating (mm)
Filter No.10 is the equivalent of Filter No.1 of Table 1.

The media of Nos. 8 to 10 were then tested for pressure drop and dirt capacity by the methods described above with reference to Table 2. The results were as follows:

TABLE 4

| Filter No | Pressure Drop (mbar) | Flow (l/min) at which pressure drop measured | Absolute Rating (mm) |
| --- | --- | --- | --- |
| 8  | 1500 | 100 | 5 |
| 9  | 840  | 60  | 5 |
| 10 | 285  | 100 | 4.3 |

It will be seen that, in comparison with the unpleated filter of No. 8, the pleated filter of No. 9 has a significantly lower pressure drop. The addition of a downstream drainage layer of depth filter medium (No.10) produces a further significant reduction in pressure drop.

A further improvement in pressure drop can be achieved by providing the filter media with upstream and downstream drainage nets. Thee drainage nets are open mesh nets of polypropylene in close contact with the adjacent surface of the media. Their effect is most pronounced with filter media having lower absolute ratings. The nets preferably have a mesh with diamond-shaped openings.

For example, providing the filter media No.2 of Table 2 and No.9 of Table 3 with upstream and downstream drainage nets had the following effect on pressure drop.

TABLE 2A

| | Pressure drop (mbar) | | |
|---|---|---|---|
| Filter No | Without Nets | With Nets | Clean water flow rate (1 pm) at which pressure drop measured |
| 2 | 107 | 95 | 100 |
| 9 | 840 | 100 | 60 |

The mesh provides the filter medium with drainage channels that improve the flow of fluid through and from the filter.

Under aggravated conditions, the provision of nets can also improve dirt capacity. For example, under conditions simulating those found in the filtration of metal oxide dispersions used in magnetic tape manufacture, the dirt capacity of filter media provided with nets is greater than the dirt capacity of otherwise identical filter media but omitting nets.

For example, the filter medium No. 2 of Table 2 was modified by providing upstream and downstream drainage nets. The modified media was then compared with unmodified media in the filtration of a suspension of Fine Test Dust supplied by the AC Spark Plug Company (ACFTD) in tetra hydrofuran (THF) with a polyurethane viscosifier to raise the viscosity to about 2 poise, and gave the following result:

TABLE 2B

| Dirt Capacity in grammes ACFTD in THF (viscosifield) | | |
|---|---|---|
| Filter No | Without Nets | With Nets |
| 2 | 27 | 38 |

It will thus be seen that the provision of drainage nets provides an improvement in dirt capacity. It is presently believed that the improvement arises because the nets prevent or limit swelling and so provide dimensional stability.

EXAMPLE 3

Two filter media were prepared having the structure given below in Table 5, using the same notation as described above with reference to Table 1.

TABLE 5

| Filter No | Upstream Structure | Absolute Rating of Upstream Structure (mm) | Downstream Structure | Absolute Rating of Downstream Structure (mm) |
|---|---|---|---|---|
| 11 | O–T,O–T | 90,20 | T–O | 90 |
| 12 | O–T | 20 | T–O | 90 |

Filter No. 12 is the equivalent of Filter No. 3 of Table 1.

The media of Nos. 11 and 12 were then tested for pressure drop and dirt capacity by the method described above with reference to Table 2. The results were as follows:

TABLE 6

| Filter No | Pressure drop (mbar) | Flow (l/min) at which pressure drop measured | Absolute Rating (mm) | Dirt Capacity (grammes) |
|---|---|---|---|---|
| 11 | 62 | 100 | 11.6 | 37 |
| 12 | 67 | 100 | 14.6 | 28 |

In this Example, Filter No. 11 was formed from three layers. The central layer has the lowest absolute rating and thus forms the filtration layers. The upstream and downstream layers form upstream and downstream drainage layers respectively.

In comparison with the two layer structure of No. 12, the three layer structure of No. 11 shows extra drainage, better (reduced) pressure drop and increased dirt capacity. In addition, although the absolute rating of the filtration layer is nominally the same in both filters, the absolute rating of the complete media is less in No. 11 than in No. 12.

EXAMPLE 4

Three pleated cylindrical filter media were prepared having a structure described above with reference to FIGS. 5 and 6 in which each filter medium is formed from a single mass of fibres where the diameter of the fibres decreases gradually from the outer surface of the upstream drainage layer 14 to the centre of the inner filtration portion 16 and then increases from the centre of the inner filtration portion to the surface of the downstream drainage layer. Using the notation introduced above in Example 1, this gives an O-T-O structure (open-tight-open). The absolute rating of the filtration portion is given in Table 7 below.

The filter media were provided with upstream and downstream open mesh polypropylene nets.

The dirt capacity and the pressure drop were then tested as described above. The results are given in Table 7 below.

TABLE 7

| Filter No | Structure | Absolute Rating (mm) | Dirt Capacity (grammes) | Pressure drop at 100 1 pm clean water flow rate (mbar) |
|---|---|---|---|---|
| 13 | O–T–O | 12 | 40 | 100 |
| 14 | O–T–O | 20 | 36 | 45 |
| 15 | O–T–O | 40 | 100 | 31 |

It will be seen that in comparison with the equivalent "non-pleated" filter media of Table 2, the media of Table 7 give reduced pressure drops. In comparison with the equivalent (or generally equivalent) filter media according to the invention of FIG. 8 in Table 2, the media of Table 7 give improved dirt capacity.

It will, of course, be appreciated that the depth filter medium need not be made by the method disclosed in GB-A-2152471. The depth filter medium, as described above, can be made by any suitable method.

In the depth filter medium of the kind described above in Example 1 (where the media is formed by two sleeves of media made by the method disclosed in GB-A-2152471) or in filter No. 11 of Example 3, where three such sleeves are provided, the sleeves need not all be of the same material. They may be of any suitable depth filter medium such as a fibrous filter material.

Figure 11:
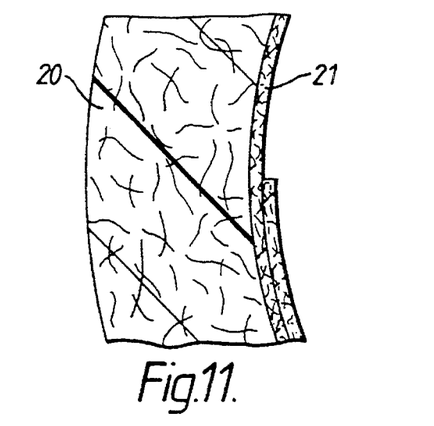
FIG. 11 is a schematic cross-section of part of a depth filter, prior to pleating and formed by an outer sleeve of polypropylene fibres and an inner sleeve of glass fibre membrane formed into a roll.

In an alternative arrangement, in the filters of Example 1, the outer sleeve may be formed by a continuous cylinder 20 of polypropylene fibrous depth filter medium, as described, but the inner sleeve may be formed of a rectangular sheet 21 of glass fibre membrane formed into a cylinder by being wrapped into a roll with opposite edges of the sheet overlapping each other at least once. This is shown in FIG. 11. The cylinders are then pleated.

EXAMPLE 5

Two pleated filter media were prepared. Both media were formed from two layers of material arranged as described above with reference to FIG. 8. In both cases, the outer layer of the filter media comprised the upstream structure of Filter No. 1 of Table 1—an O-T structure of polypropylene fibres having an absolute rating of 5 mm. In both cases the downstream layer was formed by a resin bonded glass fibre medium having the rating given in Table 8 below sold by Pall Corporation under the trade mark ULTIPOR GF. In both cases, the glass fibre medium is bound by a binder resin which coats the glass fibres, imparting a positive charge (zeta potential) to the medium. In the medium of Filter No. 17 of Table 8, the positive zeta potential was greater than in Filter No. 16 of Table 8. Both filters were provided with upstream and downstream nets.

TABLE 8

| Filter No. | Upstream Structure | | Downstream Structure | |
|---|---|---|---|---|
| | Material | Absolute Rating | Material | Absolute Rating |
| 16 | Polypropylene | 5 mm | Glass fibre (positively charged) | 1 mm (approx) |
| 17 | Polypropylene | 5 mm | Glass fibre (more highly positively charged than No.10) | 1 mm (approx) |

Filters Nos. 16 and 17 were then tested for pressure drop and dirt capacity using the tests described above with reference to Example 1. The results are as set out in Table 9 below.

TABLE 9

| Filter No. | Pressure Drop at 50 1 pm clean water flow rate (mbar) | Dirt Capacity (g) | Absolute Rating |
|---|---|---|---|
| 16 | 255 | 15.5 | less than 2 mm |
| 17 | 180 | 22 | 2.8 mm |

It will be seen that both Filter No. 16 and Filter No. 17 have reduced pressure drop when compared with the "non-pleated" medium of Table 2. They also have high dirt capacity. In addition, they have the ability of positive zeta potential filters of removing from fluids by electrostatic attraction negatively charged particles that are much smaller than the pore size of the medium. Since most particles, including bacteria and viruses, are negatively charged, this is a useful ability.

Of course, the downstream layer could have negative zeta potential. This can be useful in the removal of positively charged particles such as asbestos spores, aluminium hydroxide and cationic photoelectrolites.

As is known, polypropylene, when forming the filter medium may be provided with positive zeta potential.

Figure 12:
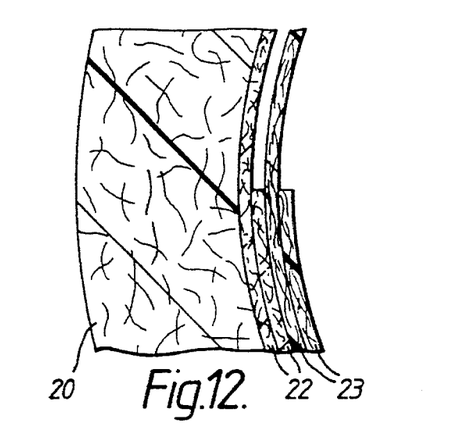
FIG. 12 is a schematic cross-section of part of a depth filter prior to pleating and formed by an outer sleeve of polypropylene fibres, a central sleeve of a glass fibre membrane formed into a roll and an outer sleeve formed from a sheet of nylon or polyester non-woven fibres formed into a roll.

In Filter No. 11 of Example 3, the central sleeve 27 may be formed of a rectangular sheet of glass fibre membrane wrapped into a roll with opposite edges overlapping at least once. The downstream layer 23 may be formed by a roll formed from a sheet of nylon or polyester non-woven fibres. This is shown in FIG. 12. The assembly is then pleated.

Figure 13:
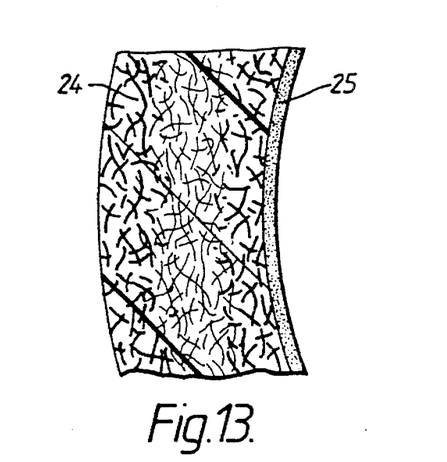
FIG. 13 is a schematic cross-section of part of a depth filter prior to pleating and showing an outer sleeve in accordance with FIG. 5 or FIG. 6 combined with an inner sleeve formed by a nylon membrane.

As seen in FIG. 13 the filter medium 24 of Example 4 may be combined with a downstream continuous or side sealed cylinder 25 of a thin membrane such as the microporous nylon membranes sold by Pall Corporation under the trade mark ULTIPOR. The combination is then pleated.

By these measures, composite pleated depth filtration media are provided which combine the lower pressure drops and higher dirt capacity of pleated depth filter medium and also include the beneficial characteristics of the specific materials described.

In all these cases, upstream and downstream drainage nets may also be provided, as shown in FIG. 11.

It has been found that the pleated depth filter media described above with reference to the drawings can have advantageous performance when used in many applications. They are particularly advantageous when used in the filtration of high viscosity fluids. In particular benefits have been found in the filtration of the following fluids:

1. Metal/metal oxide dispersions in organic solvents with viscosifying additives, as used in the manufacture of magnetic tapes
2. Solutions based on, for example, gelatin as used in photo emulsions
3. Fermenter broths
4. Ink solutions for ink jet printing machinery
5. Blood plasma
6. Monomers
7. Dialysis gels
8. Syrups used in the food and beverage industries
9. Viscous fluids used in the pharmaceutical industry, such as in the preparation of cough syrups
10. Other high viscosity fluids such as concentrated HCL.

What is claimed is:

1. A filter element comprising a generally cylindrical depth filter medium without any side seal, said filter medium being formed by at least one continuous sleeve of fibrous filter medium provided with pleats extending along the length of the fibrous filter medium and parallel to one another around the fibrous filter medium, an inner support core within the pleated depth filter medium and contacting inward ends of the pleats.

2. A filter element according to claim 1 wherein the filter medium comprises an inner filtration layer arranged between upstream and downstream drainage layers, the downstream drainage layer being formed integrally with at least a part of the inner filtration layer and having an absolute rating that is greater than the absolute rating of the inner filtration layer.

3. A filter element according to claim 2 and formed as a single pleated cylindrical sleeve, an outer portion of the sleeve forming an upstream drainage layer, a central portion of the sleeve forming an inner filtration layer and an inner portion of the sleeve forming the downstream drainage layer.

4. A filter element according to claim 3 wherein the filter medium is formed by a fibrous mass of non-woven synthetic polymeric micro-fibres, said micro-fibres being substantially free of fibre-to-fibre bonding and secured to each other by mechanical entanglement or inter-twining, said fibrous mass having a substantially constant voids volume, the diameter of the fibrous structure decreasing from an exterior surface of the sleeve to the centre of the sleeve and then increasing from the centre of the sleeve to an interior surface of the sleeve, to form successively said upstream drainage layer, said inner filtration layer and said downstream drainage layer.

5. A filter element according to claim 4 wherein the mass of micro-fibres has a constant smaller diameter in the inner filtration layer and has a constant larger diameter in the downstream drainage layer.

6. A filter element according to claim 4 wherein the mass of micro-fibres has a diameter that increases through the inner filtration layer and the downstream drainage layer.

7. A filter element according to claim 4 wherein the mass of micro-fibres has a constant smaller diameter in the inner filtration layer and an increasing diameter in the downstream drainage layer.

8. A filter element according to claim 4 wherein the mass of micro-fibres has a constant smaller diameter in the inner filtration layer and has a constant larger diameter in the upstream drainage layer.

9. A filter element according to claim 4 wherein the mass of micro-fibres has a diameter that increases through the inner filtration layer and the upstream drainage layer.

10. A filter element according to claim 9 wherein the mass of micro-fibres has a constant smaller diameter in the inner filtration layer and has a diameter that increases through the upstream drainage layer to the surface of the upstream drainage layer.

11. A filter element according to claim 6 wherein a pleated cylinder of a microporous nylon membrane is provided downstream of the filter medium, an exterior surface of the membrane contacting an interior surface of the filter medium.

12. A filter element according to claim 2 and formed as two pleated cylindrical sleeves arranged one inside the other with an outer surface of one sleeve in contact with an inner surface of the other sleeve, the outer sleeve forming the upstream drainage layer and a part of the inner filtration layer and the inner sleeve forming the remainder of the inner filtration layer and the downstream drainage layer, the outer sleeve being formed from a first material and the inner sleeve being formed from a second material.

13. A filter element according to claim 12 wherein the inner sleeve forming said remainder of the inner filtration layer and said downstream drainage layer comprises a fibrous mass of non-woven synthetic polymeric micro-fibres, said micro-fibres being substantially free of fibre-to-fibre bonding and secured to each other by mechanical entanglement or inter-twining, said fibrous mass having a substantially constant voids volume, the diameter of the fibrous structure increasing in a downstream direction so that a downstream portion of said fibrous mass forms said drainage layer.

14. A filter element according to claim 13 wherein the mass of micro-fibres has a constant smaller diameter in the remainder of the inner filtration layer and has a constant larger diameter in the downstream drainage layer.

15. A filter element according to claim 13 wherein the mass of micro-fibres has a diameter that increases through the remainder of the inner filtration layer and the downstream drainage layer.

16. A filter element according to claim 13 wherein the mass of micro-fibres has a constant smaller diameter in the remainder of the inner filtration layer and an increasing diameter in the downstream drainage layer.

17. A filter element according to claim 12 wherein the outer sleeve is formed by a fibrous mass of non-woven synthetic polymeric micro-fibres, said micro-fibres being substantially free of fibre-to-fibre bonding and secured to each other by mechanical entanglement or inter-twining, said fibrous mass having a substantially constant voids volume, the diameter of the fibrous structure increasing in an upstream direction from said part of the inner filtration layer so that an upstream portion of said fibrous mass forms said upstream drainage layer.

18. A filter element according to claim 17 wherein the mass of micro-fibres has a constant smaller diameter in the part of the inner filtration layer and has a constant larger diameter in the upstream drainage layer.

19. A filter element according to claim 17 wherein the mass of micro-fibres has a diameter that increases through the part of the inner filtration layer and the upstream drainage layer.

20. A filter element according to claim 17 wherein the mass of micro-fibres has a constant smaller diameter in the part of the inner filtration layer and has a diameter that increases through the upstream drainage layer to the surface of the upstream drainage layer.

21. A filter element according to claim 12 wherein at least one of said sleeves is formed from glass fibres bound together by a resin.

22. A filter element according to claim 1 wherein an additional pleated cylinder of a mass of nylon non-woven fibres is provided downstream of said at least one sleeve, the additional cylinder having an exterior surface in contact with an interior surface of said at least one sleeve.

23. A filter element according to claim 1 wherein ratio of surface area per unit length to depth of the filter medium is in the range from 20 to 2000.

24. A filter element according to claim 23 wherein the ratio of surface area per unit length to depth of the filter medium is in the range from 40 to 200.

25. A filter element according to claim 1 wherein the filter element has an inner surface and an outer surface, said surfaces being covered by respective drainage nets.

26. A filter element comprising a generally cylindrical depth filter medium including an inner filtration layer arranged between upstream and downstream drainage layers, the downstream drainage layer being formed integrally with at least a part of the inner filtration layer and having an absolute rating that is greater than the absolute rating of the inner filtration layer, the depth filter medium being provided with pleats extending along the length of the filter medium and parallel to one another around the filter medium, and an inner support core within the pleated depth filter medium and contacting inner pleats.

27. A filter element according to claim 26 in which the depth filter medium is formed by at least one continuous sleeve of filter medium without any side seal.

28. A filter element according to claim 26 and formed as a single pleated cylindrical sleeve, an outer portion of the sleeve forming an upstream drainage layer, a central portion of the sleeve forming an inner filtration layer and an inner portion of the sleeve forming the downstream drainage layer.

29. A filter element according to claim 28 wherein the filter medium is formed by a fibrous mass of non-woven synthetic polymeric micro-fibres, said micro-fibres being substantially free of fibre-to-fibre bonding and secured to each other by mechanical entanglement or inter-twining, said fibrous mass having a substantially constant voids volume, the diameter of the fibrous structure decreasing from an exterior surface of the sleeve to the centre of the sleeve and then increasing from the centre of the sleeve to an interior surface of the sleeve, to form successively said upstream drainage layer, said inner filtration layer and said downstream drainage layer.

30. A filter element according to claim 29 wherein the mass of micro-fibres has a constant smaller diameter in the inner filtration layer and has a constant larger diameter in the downstream drainage layer.

31. A filter element according to claim 29 wherein the mass of micro-fibres has a diameter that increases through the inner filtration layer and the downstream drainage layer.

32. A filter element according to claim 29 wherein the mass of micro-fibres has a constant smaller diameter in the inner filtration layer and an increasing diameter in the downstream drainage layer.

33. A filter element according to claim 29 wherein the mass of micro-fibres has a constant smaller diameter in the inner filtration layer and has a constant larger diameter in the upstream drainage layer.

34. A filter element according to claim 29 wherein the mass of micro-fibres has a diameter that increases through the inner filtration layer and the upstream drainage layer.

35. A filter element according to claim 29 wherein a pleated cylinder of a microporous nylon membrane is provided downstream of the filter medium, an exterior surface of the membrane contacting an interior surface of the filter medium.

36. A filter element according to claim 26 and formed as two pleated cylindrical sleeves arranged one inside the other with an outer surface of one sleeve in contact with an inner surface of the other sleeve, the outer sleeve forming the upstream drainage layer and a part of the inner filtration layer and the inner sleeve forming the remainder of the inner filtration layer and the downstream drainage layer, the outer sleeve being formed from a first material and the inner sleeve being formed from a second material.

37. A filter element according to claim 36 wherein at least one of said sleeves is formed from glass fibres bound together by a resin.

38. A filter element according to claim 26 wherein ratio of surface area per unit length to depth of the filter medium is in the range from 20 to 2000.

39. A filter element according to claim 38 wherein the ratio of surface area per unit length to depth of the filter medium is in the range from 40 to 200.

40. A filter element according to claim 26 wherein the filter element has an inner surface and an outer surface, said surfaces being covered by respective drainage nets.

41. A method of manufacturing a filter element comprising forming at least one continuous sleeve of fibrous depth filter medium without any side seal, pleating the sleeve to form a plurality of pleats extending along the length of the filter medium and parallel to one another around the filter medium, and arranging an inner support core within the pleated depth filter medium contacting inward ends of the pleats.

42. A method according to claim 41 and comprising forming the medium with an inner filtration layer arranged between upstream and downstream drainage layers, the downstream drainage layer being formed integrally with at least a part of the inner filtration layer and having an absolute rating that is greater than the absolute rating of the inner filtration layer.

43. A method according to claim 42 and comprising forming the cylindrical depth filter medium from a single pleated cylindrical sleeve, an outer portion of the sleeve forming an upstream drainage layer, a central portion of the sleeve forming an inner filtration layer and an inner portion of the sleeve forming the downstream drainage layer.

44. A method according to claim 42 and comprising forming two cylindrical sleeves, arranging one sleeve inside the other sleeve with an outer surface of one sleeve in contact with an inner surface of the other sleeve, and then pleating the sleeves, the outer sleeve forming the upstream drainage layer and a part of the inner filtration layer and the inner sleeve forming the remainder of the inner filtration layer and the downstream drainage layer.

45. A method according to claim 44 and comprising forming two sleeves from a fibrous mass of non-woven synthetic polymeric micro-fibres, said micro-fibres being substantially free of fibre-to-fibre bonding and secured to each other by mechanical entanglement or inter-twining, said fibrous mass having substantially constant voids volume, the diameter of the fibrous structure decreasing in a downstream direction, inverting one of said cylindrical sleeves so that an interior surface thereof becomes an exterior surface and then inserting the inverted sleeve into the other sleeve prior to pleating.

46. A method of manufacturing a filter element comprising forming a generally cylindrical depth filter medium including an inner filtration layer, arranged between upstream and downstream drainage layers, forming the downstream drainage layer integrally with at least a part of the inner filtration layer and with an absolute rating that is greater than the absolute rating of the filtration layer, pleating the depth filter medium to provide pleats extending along the length of the filter medium and parallel to one another around the depth filter medium and then providing an inner support core within the pleated depth filter medium and contacting inner pleats.

47. A method according to claim 46 and comprising forming the cylindrical depth filter medium from a single pleated cylindrical sleeve, an outer portion of the sleeve forming an upstream drainage layer, a central portion of the sleeve forming an inner filtration layer and an inner portion of the sleeve forming the downstream drainage layer.

48. A method according to claim 46 and comprising forming two cylindrical sleeves, arranging one sleeve inside the other sleeve with an outer surface of one sleeve in contact with an inner surface of the other sleeve, and then pleating the sleeves, the outer sleeve forming the upstream drainage layer and a part of the inner filtration layer and the inner sleeve forming the remainder of the inner filtration layer and the downstream drainage layer.

49. A method according to claim 48 and comprising forming two sleeves from a fibrous mass of non-woven synthetic polymeric micro-fibres, said micro-fibres being substantially free of fibre-to-fibre bonding and secured to each other by mechanical entanglement or inter-twining, said fibrous mass having substantially constant voids volume, the diameter of the fibrous structure decreasing in a downstream direction, inverting one of said cylindrical sleeves so that an interior surface thereof becomes an exterior surface and then inserting the inverted sleeve into the other sleeve prior to pleating.

* * * * *